United States Patent [19]

Englund

[11] Patent Number: 5,775,677
[45] Date of Patent: Jul. 7, 1998

[54] AIR OR GAS SPRUNG AND DAMPENED SHOCK ABSORBER

[76] Inventor: Arlo C. Englund, 4945 Parkvista Blvd., Colorado Springs, Colo. 80918

[21] Appl. No.: 631,853

[22] Filed: Apr. 12, 1996

Related U.S. Application Data

[63] Continuation-in-part of Ser. No. 388,055, Feb. 7, 1995, abandoned.

[51] Int. Cl.$^6$ .................. F16F 9/02; F16F 9/36; F16F 5/00
[52] U.S. Cl. .................. 267/64.11; 188/317; 188/322.19; 267/64.26; 267/124; 267/64.25
[58] Field of Search ............. 267/64.11–64.28, 267/114, 120–129; 92/134; 16/66, 84; 280/711; 213/43, 41, 223; 188/317, 311, 316, 282, 281, 322.22, 322.19, 322.15, 269, 322.13, 322.14, 280, 282.1, 282.5, 282.6, 282.8, 282.9, 283, 284, 286, 319.1

[56] References Cited

U.S. PATENT DOCUMENTS

| | | |
|---|---|---|
| 675,912 | 6/1901 | Wenneborg, Jr. . |
| 920,251 | 5/1909 | Blankenship et al. . |
| 967,285 | 8/1910 | Wilson . |
| 1,135,923 | 4/1915 | Reynolds . |
| 1,205,433 | 11/1916 | Christman . |
| 1,212,322 | 1/1917 | Buckingham . |
| 1,318,749 | 10/1919 | Haeberlein . |
| 1,618,326 | 2/1927 | Cosentino . |
| 1,877,543 | 9/1932 | Wendelstadt . |
| 2,032,189 | 2/1936 | Stilling . |
| 2,061,170 | 11/1936 | Post . |
| 2,101,265 | 12/1937 | Mercier .................. 267/64.11 |
| 2,148,891 | 2/1939 | Applegarth . |
| 2,678,114 | 5/1954 | Koning et al. . |
| 3,083,038 | 3/1963 | Moulton . |
| 3,147,967 | 9/1964 | Bougeard . |
| 3,260,515 | 7/1966 | Albers . |

(List continued on next page.)

FOREIGN PATENT DOCUMENTS

| | | | |
|---|---|---|---|
| 448266 | 5/1948 | Canada . | |
| 670589 | 11/1929 | France .................. | 267/64.14 |
| 2421007 | 11/1975 | Germany .................. | 267/64.26 |
| 3813021 | 11/1989 | Germany .................. | 267/64.26 |

*Primary Examiner*—Douglas C. Butler
*Attorney, Agent, or Firm*—Sixbey, Friedman, Leedom & Ferguson; David S. Safran

[57] ABSTRACT

An air or gas sprung and dampened shock absorber for a bicycle is set forth comprising a cylinder having a closed end and an open end forming a compression chamber, a shaft having a closed end and an open end, the open end of the shaft being reciprocally received within the cylinder through the open end of the cylinder, a piston sealingly positioned in the open end of the shaft and slidably and sealingly positioned adjacent an inner surface of the cylinder forming a rebound chamber in the shaft and a gas spring chamber formed between an outer surface of the shaft and an inner surface of the cylinder wherein the gas spring chamber communicates with the rebound chamber during at least a portion of the compression and rebound stroke of the shock absorber. The shock absorber further includes a compression plate sealingly received in the shaft with an axial position of the compression plate being selectively moveable within the shaft for varying a total volume of the shock absorber. Alternatively, an air or gas sprung and dampened shock absorber for a bicycle may comprise a first chamber having a first closed end and a second open end, a second chamber having a closed first end and a second end sealingly and reciprocally received in the first chamber with the second end including a piston sealingly secured thereto is set forth. The piston includes at least one valved passage which permits the flow of gas pressure from the first chamber to the second chamber and a return orifice which restrictively permits at least the flow of gas pressure from the second chamber to the first chamber with the first and second chambers, the valved passage and the return orifice being sized such that upon compression of the shock absorber from an initial position, forces acting on the piston in the first chamber are substantially greater than forces acting on the piston in the second chamber to spring the piston back towards the initial position.

8 Claims, 9 Drawing Sheets

U.S. PATENT DOCUMENTS

| | | | |
|---|---|---|---|
| 3,379,430 | 4/1968 | Hennells | 267/64.25 |
| 3,459,441 | 8/1969 | Hornsby . | |
| 3,706,362 | 12/1972 | Faure . | |
| 4,030,715 | 6/1977 | Duran . | |
| 4,030,716 | 6/1977 | Freitag . | |
| 4,036,335 | 7/1977 | Thompson et al. . | |
| 4,057,236 | 11/1977 | Hennells . | |
| 4,153,266 | 5/1979 | Uhls . | |
| 4,226,167 | 10/1980 | Lew | 92/134 |
| 4,325,468 | 4/1982 | Siorek . | |
| 4,438,833 | 3/1984 | Schafer . | |
| 4,596,320 | 6/1986 | Shimokura et al. . | |
| 4,735,401 | 4/1988 | Buma et al. . | |
| 4,742,898 | 5/1988 | Lee | 188/315 |
| 4,759,260 | 7/1988 | Lew | 92/134 |
| 4,805,517 | 2/1989 | Conley et al. | 188/287 |
| 4,815,763 | 3/1989 | Hartmann . | |
| 4,834,223 | 5/1989 | Kawamura et al. . | |
| 4,859,006 | 8/1989 | Philippe et al. | 267/64.26 |
| 4,881,750 | 11/1989 | Hartmann . | |
| 4,935,985 | 6/1990 | Wang | 267/64.26 |
| 4,936,424 | 6/1990 | Costa . | |
| 4,948,104 | 8/1990 | Wirges . | |
| 4,971,344 | 11/1990 | Turner . | |
| 5,088,705 | 2/1992 | Tsai . | |
| 5,098,114 | 3/1992 | Jones . | |
| 5,104,098 | 4/1992 | Kaneko . | |
| 5,140,894 | 8/1992 | Snyder et al. | 92/134 |
| 5,195,766 | 3/1993 | Dohrmann et al. . | |
| 5,248,159 | 9/1993 | Moore . | |
| 5,284,352 | 2/1994 | Chen . | |
| 5,303,906 | 4/1994 | Cotter et al. | 267/64.11 |
| 5,308,099 | 5/1994 | Browning . | |
| 5,320,375 | 6/1994 | Reeves et al. . | |
| 5,417,446 | 5/1995 | Pileggi . | |
| 5,435,530 | 7/1995 | Sand | 267/114 |
| 5,445,401 | 8/1995 | Bradbury . | |
| 5,449,189 | 9/1995 | Chen . | |
| 5,460,251 | 10/1995 | Jeffries . | |
| 5,470,090 | 11/1995 | Stewart et al. . | |
| 5,478,099 | 12/1995 | Kawahara . | |
| 5,588,641 | 12/1996 | Sand | 267/119 |
| 5,628,496 | 5/1997 | Chamberlin | 267/64.11 |

AIR OR GAS SPRUNG AND DAMPENED SHOCK ABSORBER

This application is a continuation-in-part application of U.S. application Ser. No. 08/388,055, filed Feb. 7, 1995, now abandoned.

BACKGROUND OF THE INVENTION

1. Technical Field

The present invention relates to a shock absorber having a dampening system which controls the compression and rebound stroke of the shock absorber. More specifically, the invention pertains to an air or gas sprung shock absorber which utilizes a pressurized gas for damping the compression and rebound stroke, wherein the compression and rebound strokes may be variably controlled.

2. Background Art

Conventional bicycles have been manufactured having the front and rear wheels attached to the bicycle frame without a shock absorbing apparatus connected therebetween. Therefore, all shocks and bumps encountered by the wheels from the terrain being travelled are transferred to the bicycle frame which results in a jarring and uncomfortable ride for the bicycle operator. Many shock absorbing devices have been designed in an effort to provide a more comfortable ride for the bicycle operator. These shock absorbers are generally connected between the wheels and the bicycle frame, so that the frame will be cushioned by the shock absorber from any forces imparted on the wheels from bumps which they encounter. While these conventional shock absorbers do serve to cushion the bicycle operator from jolts, they also tend to create a bouncy ride for the operator. The bouncy ride is created when a wheel is forced into the shock absorber by a bump and the shock absorber, in turn, exerts a force to return the wheel to its ordinary position. When the shock absorber accepts and returns the force exerted from the wheel quickly, a bouncy movement is imparted on the bicycle frame.

In an effort to reduce the springy ride produced by the shock absorbers, dampening systems were developed that controlled the compression and rebound stroke of the shock absorbers. Reducing the velocity at which the shock absorbers compress or rebound results in a smoother ride for the operator. However, these devices usually control the dampening characteristics of the shock absorber through the use of a fluid or friction, which often times do not perform satisfactorily under certain conditions and adds weight which is undesirable in bicycles. The bicycle suspension system disclosed in U.S. Pat. No. 3,083,038 issued to Moulton includes damping of the suspension by friction between telescoping elements and a bushing in the bicycle fork tube, but the materials in friction dampening systems as such tend to break down in a relatively short time.

U.S. Pat. No. 4,971,344 to Turner discloses a fluid dampening system commonly employed in shock absorbers. The fluid dampening system comprises telescoping tubes filled with a viscous fluid, such as oil, wherein a dampening valve in the tubes creates two chambers for holding the oil. The dampening valve then meters the flow of oil between the chambers upon compression and extension of the telescoping tubes. However, using oil as the dampening medium creates several disadvantages when the energy absorbed by the dampening system is dissipated as heat. First, the oil flow rate changes when extreme heat is created from the damping forces that are being dissipated. Additionally, viscous fluids tend to loose viscosity under extreme heat and become sluggish in cold temperatures. Therefore, there is a need for a dampening system which utilizes a medium that does not loose viscosity or substantially change pressure under extreme heat. These disadvantages can be avoid by using highly pressurized air or gas, such as nitrogen, in the range of 60 to 350 psi as the dampening medium. Highly pressurized gases do not loose viscosity under extreme heat, and these gases retain the same dampening characteristics over ambient temperature changes. U.S. Pat. No. 5,163,697 issued to Kastan discloses the use of a gas in a sealed chamber in an energy damping apparatus of a bicycle shock absorber. The gas serves to provide a springing movement of a steering tube that moves upward into the sealed chamber upon incurring a shock by the front wheel, but it returns the steering tube immediately to its resting position after the effect of the shock has passed. Therefore, this damping system only effectively dampens the compression stroke of the shock absorber and not the rebound stroke.

With reference to U.S. Pat. No. 4,030,715, issued to Duran, a pneumatic shock absorber for suspension of cars or similar vehicles is disclosed wherein the shock absorber is initially filled with an air charge injected through a needle valve wherein both an upper and lower chamber on opposing sides of the reciprocal piston initially start at the same pressure prior to the compression of the vehicle suspension. When the piston is lowered, it causes air contained in the lower chamber to flow towards the upper chamber around the piston which results in an opening of a valve in the upper chamber where the volume of the piston stem reduces the capacity of the chamber, such that an incremental increase in pressure takes place prior to the return of the suspension and rise of the piston which consequently closes the valve. That is, in accordance with the Duran reference, the pressure within the upper chamber exceeds that in the lower chamber prior the suspension reaching its lowermost point of compression and on return, air returns towards the bottom chamber through a nozzle passage with this flow determining the desired braking power of the suspension. Accordingly, the suspension set forth by Duran is not an air sprung shock absorber, and must include an external spring force such as springs commonly used in vehicle suspensions to initiate and return the shock absorber to its equilibrium or rest position. Further, the method used to achieve the braking force of the rebound damping is no different than that method used in oil dampened shock absorbers. Moreover, these springs are required in order to support the load of the vehicle.

As will be discussed in greater detail herein below, in accordance with the present invention, the air spring air dampened shock absorber set forth hereinbelow requires a correct volume to achieve the rate of progression in the true spring rate. In this regard, the effective cross-sectional area on the rebound side of the piston must be greatly reduced as compared to the effective cross-sectional area of the shaft which governs the initial spring rate. Again, these features will be discussed in greater detail hereinbelow.

Therefore, as can be seen from the foregoing, there is clearly a pressing need for a light weight air sprung air dampened shock absorber that is capable of controlling both the compression and rebound damping while maintaining substantially constant damping threw all anticipated temperatures.

SUMMARY OF THE INVENTION

It is a primary object of the present invention to overcome the aforementioned shortcomings associated with the prior art.

Another object of the present invention is to provide a shock absorber which utilizes air pressure or a gas pressure as the damping medium within the air or gas sprung shock absorber.

Yet another object of the present invention is to provide a shock absorber whose damping characteristics do not vary with fluxuations in temperature.

It is yet another object of the present invention to provide a shock absorber which utilizes a damping medium that will not create a messy environment around the shock absorber if a leak develops thereby allowing the damping medium to escape from the shock absorber.

A further object of the present invention is to provide a shock absorber whose damping characteristics can be readily adjusted for a particular surface on which the bicycle is travelling.

A further object of the present invention is to control the rebound or return of the shock absorber by releasing pressure at a controlled rate back to the chamber which governs the spring force.

A still further object of the present invention is to provide a shock absorber having a negative air spring chamber to change the air spring rate of the shock absorber.

These as well as additional objects and advantages of the present invention are achieved by providing a gas sprung shock absorber for a bicycle comprising a cylinder having a closed end and an open end forming a compression chamber, a shaft having a closed end and an open end, the open end of the shaft being reciprocally received within the cylinder through the open end of the cylinder, a piston sealingly positioned in the open end of the shaft and slidably and sealingly positioned adjacent an inner surface of the cylinder forming a rebound chamber in the shaft and a gas spring chamber formed between an outer surface of the shaft and an inner surface of said cylinder wherein the gas spring chamber communicates with the rebound chamber during at least a portion of the compression and rebound stroke of the shock absorber. The shock absorber further includes a compression plate sealingly received in the shaft with an axial position of said compression plate being selectively moveable within the shaft for varying a volume of the shock absorber as a whole.

The shock absorber being constructed such that the effective cross-sectional area on a rebound side of the piston is substantially less as compared to the effective cross-sectional area on the compression side of the piston so as to achieve an air or gas sprung and air or gas dampened shock absorber.

Alternatively, the air or gas sprung shock absorber for a bicycle may include a first chamber having a first closed end and a second open end, a second chamber having a closed first end and a second end sealingly and reciprocally received in the first chamber with the second end including a piston sealingly secured thereto. The piston includes at least one valved passage which permits the flow of gas pressure from the first chamber to the second chamber and a return orifice which restrictively permits at least the flow of gas pressure from the second chamber to the first chamber with the first and second chambers, the valved passage and the return orifice being sized such that upon compression of the shock absorber from an initial rest position, forces acting on the piston in the first chamber are substantially greater than forces acting on the piston in the second chamber to spring the piston back towards the rest position.

These as well as additional advantages of the present invention will become apparent from the following detailed description of the invention with reference to the several figures.

BRIEF DESCRIPTION OF THE DRAWINGS

FIG. 11 is a cross-sectional view of an air sprung shock absorber in accordance with a preferred embodiment of the present invention illustrated in the uncompressed state.

FIG. 11 A is an exploded view of section A of FIG. 11.

DETAILED DESCRIPTION OF THE PRESENT INVENTION

Figure 1:
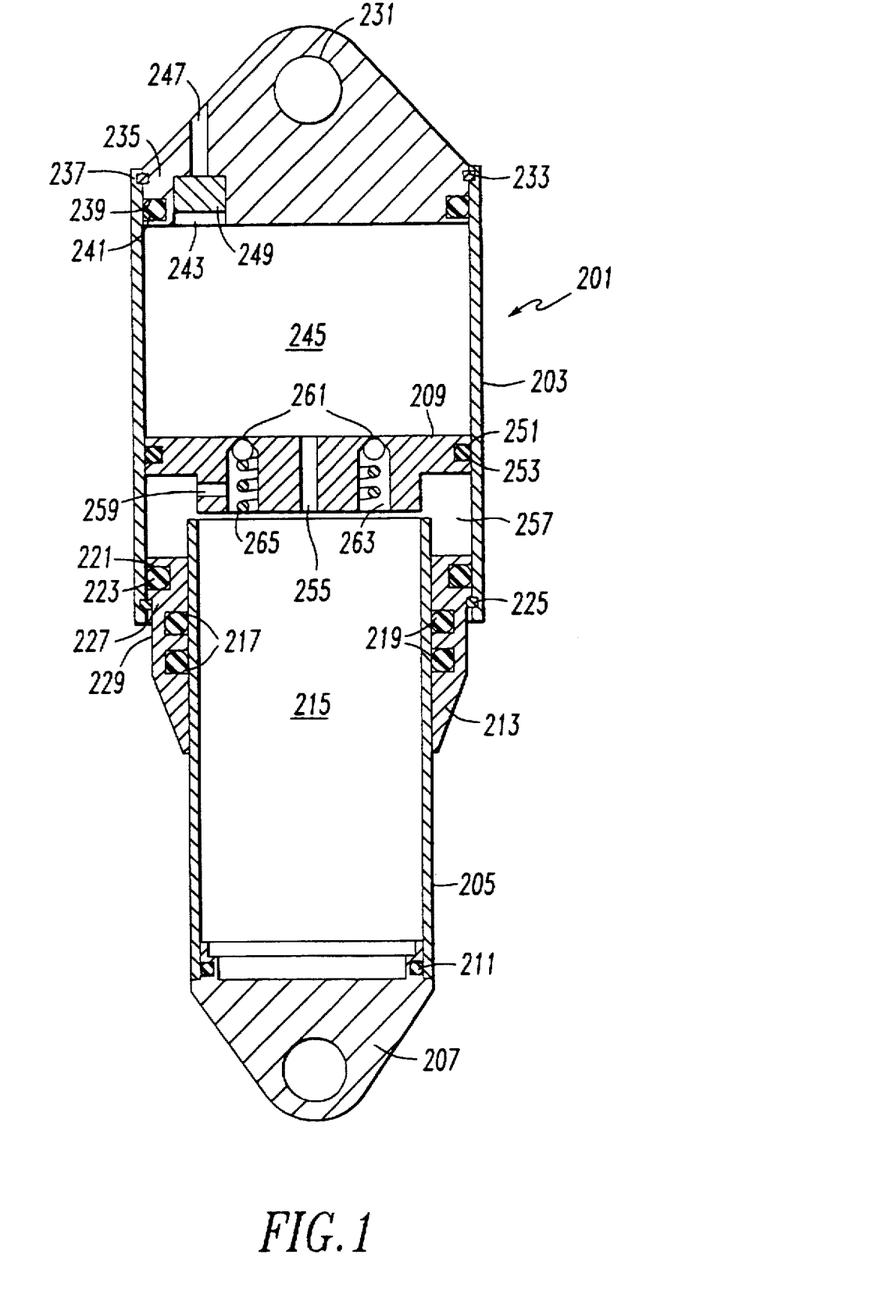
FIG. 1 is a sectional view of a shock absorber in accordance with the present invention.

Referring initially to FIG. 1, an air or gas spring shock absorber 201 is illustrated having both shock absorbing and damping characteristics as well as the capability of rebounding at a controlled rate. The shock absorber 201 allows for quick compression when a jolt is received while damping this same compression movement and the rebound movement of the shock absorber 201. The shock absorber 201 includes two housings or cylinders 203 and 205, wherein housing or cylinder 205 which may be considered a shaft is telescopically received within the housing or cylinder 203. The housing or cylinder 205 is closed at on one end by a connector eyelet 207 and on its opposite end by a valve piston 209. The connector eyelet 207 extends into and abuts the interior surface of the housing 205 with the eyelet 207 being attached to the housing by an annular seal 211 which fictionally engages both the eyelet 207 and the housing 205. The annular seal 211 further prevents gas pressure from passing between the housing 205 and the eyelet 207. The housing 205 extends from the eyelet 207 to the valve piston 209, and passes through a seal head 213. A chamber 215 for holding a gas pressure is formed in the housing 205 between the valve piston 209 and the eyelet 207. The housing 205 is in telescopic relationship with the seal head 213, which is partially positioned within the housing 203. The interior perimeter of the seal head 213 is of the same general shape as housing 205 so as to allow the seal head 213 to travel transversely within housing 205 with the exterior perimeter of the seal head 213 abutting the housing 203. The seal head 213 includes a pair of annular grooves 217 formed therein for retaining annular seals 219 therein which prevent the flow of gas pressure from passing between the interior perimeter of the seal head 213 and the housing 205. The exterior perimeter of the seal head 213 is of the same general shape as housing 203 since the exterior perimeter of the seal head 213 abuts the interior surface of the housing 203. The seal head 213 further comprises an annular recess 221 about its exterior perimeter for retaining an annular seal 223 therein, wherein annular seal 223 prevents the flow of gas pressure between the exterior perimeter of the seal head 223 and the interior perimeter of the housing 203. The seal head 223 is retained in a stationary position with respect the housing 203 by retaining ring 225, which is positioned between an annular flange 227 on the seal head 213 and an annular recess 229 in the interior perimeter of the housing 203.

The housing 203 extends from the seal head 213 on one end to a connecting eyelet 231 on its opposite end. Connecting eyelet 231 is positioned within the end of the housing 203, and the eyelet 231 is retained in a stationary position with respect the housing 203 by retaining ring 233, which is positioned between an annular flange 235 on the eyelet 231 and an annular recess 237 in the interior perimeter of the housing 203. The eyelet also includes an annular groove 239 formed about its exterior perimeter for retaining an annular seal 241 therein, wherein the annular seal 241 prevents the flow of gas pressure between the connecting eyelet 231 and the housing 203. The eyelet 231 further includes a passage 243 which extends through the eyelet 231 into chamber 245, wherein an opening 247 is provided in the eyelet 231 for allowing gaseous communication between the passage 243 and the exterior of the housing 203. A plug 249 is positioned within the passage 243, whereby the dimensions of the plug 249 encompass the entire area across the passage 243 to prevent the flow of gas pressure between the plug 243 and the passage wall. The plug 243 is comprised of rubber or other suitable material having a passage which is normally closed but may be opened by forcing an object such as a pump needle therethrough.

The valve piston 209 is positioned within the chamber 203 such that the exterior perimeter of the valve piston 209 abuts the interior perimeter of the chamber 203. The valve piston includes an annular groove 251 formed about its exterior surface for retaining annular seal 253 therein, wherein annular seal 253 prevents the flow of gas pressure from passing between the exterior surface of the valve piston 209 and the interior perimeter of the housing 203. The valve piston 209 transversely travels within the housing 203 when compressed by the connecting eyelets 207 and 231. Another chamber 245 for retaining a gas pressure therein is formed between the valve piston 209 and connecting eyelet 231 in the housing 203, and valve piston 209 separates the chamber 245 from gaseous communication with chamber 215. However, a passage 255 is formed in valve piston 209 and extends from chamber 245 to chamber 215 for allowing gas pressure to communicate between the two chambers. Therefore, the gas pressure within chambers 245 and 215 will be at equal pressures when the shock absorber 201 is in its extended or relaxed position, because the gas within the chambers will travel through the passage 255 to the chamber with the lower pressure until the two chambers 215 and 245 are at equal pressures.

A third chamber 257 for retaining gas pressure therein is formed between the interior perimeter of housing 203 and the exterior perimeter of housing 205, wherein the valve piston 209 serves to seal off the top of the chamber 257 while seal head 213 serves as the bottom of the chamber 257. The valve piston 209 further includes at least one passage 259 which extends from chamber 257 to chamber 215 for allowing pressure to communicate between the two chambers. Therefore, the gas within chambers 215, 245 and 257 will be at equal pressures when the shock absorber 201 is in its extended position. Passages 261 and 255 function to dampen the compression and rebound characteristics of the valve piston 209 by restricting the flow of gas pressure between the chambers.

Valve piston 209 also includes at least one control valve 261 positioned in a passageway 263 which extends from chamber 245 to chamber 215. Control valve 261 allows the flow of gas pressure from chamber 245 to chamber 215, but prevents the reverse flow of gas pressure in the direction from chamber 215 into chamber 245. Control valve 261 is preferably of a spring-loaded type check valve, but any valve which only allows gas pressure to the flow pressure in a single direction may be used with the present invention. When the pressure within chamber 245 is great enough to overcome the force being exerted by spring 265 in the control valve 261, the control valve 261 will open and allow gas pressure to flow from chamber 245 to chamber 215. The control valve 261 functions to permit gas to quickly travel from chamber 245 to chamber 215 when the shock absorber 201 is compressed. Therefore, this design allows the shock absorber 201 to quickly engross a large shock while further dampening the compression through passages 263, 259 and 255.

During operation, the shock absorber 201 functions when connecting eyelets 231 and 207 are compressed towards each other. The eyelet 207 imparts an upward force on the housing 205 during compression which is, in turn, passed on to valve piston 209. The valve piston 209 will then begin to travel within the housing 203 towards eyelet 231, which causes the total shock volume to decrease, and as the total shock volume decreases the total shock pressure will increase. It can be noted that chambers 215, 245 and 257 make up the total shock volume which governs how much the total shock pressure will increase. As the volume in chamber 245 decreases and the air or gas is forced substantially unrestricted depending on valve settings into chambers 215 and 257 wherein the combined volume of the chambers 215 and 257 increase substantially less than the volume of chamber 245 decreases. Once the valve piston 209 reaches its furthest most position within the chamber 245, the effective forces acting on valve piston 209 within the compression chamber 245 increases are substantially greater than the effective forces acting against the valve piston 209 within the chamber 257. Accordingly, once the shock has been absorbed by the shock absorber traveling initially in a compression direction, the residual pressure and effective force build up in chamber 245 will initiate the return of the valve piston 209 to its original or rest position. Initial movement of the piston 209 towards its steady state or rest position causes the pressure within the chamber 245 to decrease dramatically such that the effective forces acting on the valve piston 209 substantially instantaneously drop to approximately equal the effective forces acting against the valve piston within chamber 257 which in turn allows the pressurized air within chambers 215 and 257 to return in a controlled manner through passage 255 thereby controlling the rebound stroke of the shock absorber. This rebound stroke will continue until the pressures within chambers 215, 257 and 245 become equal.

Figure 2:
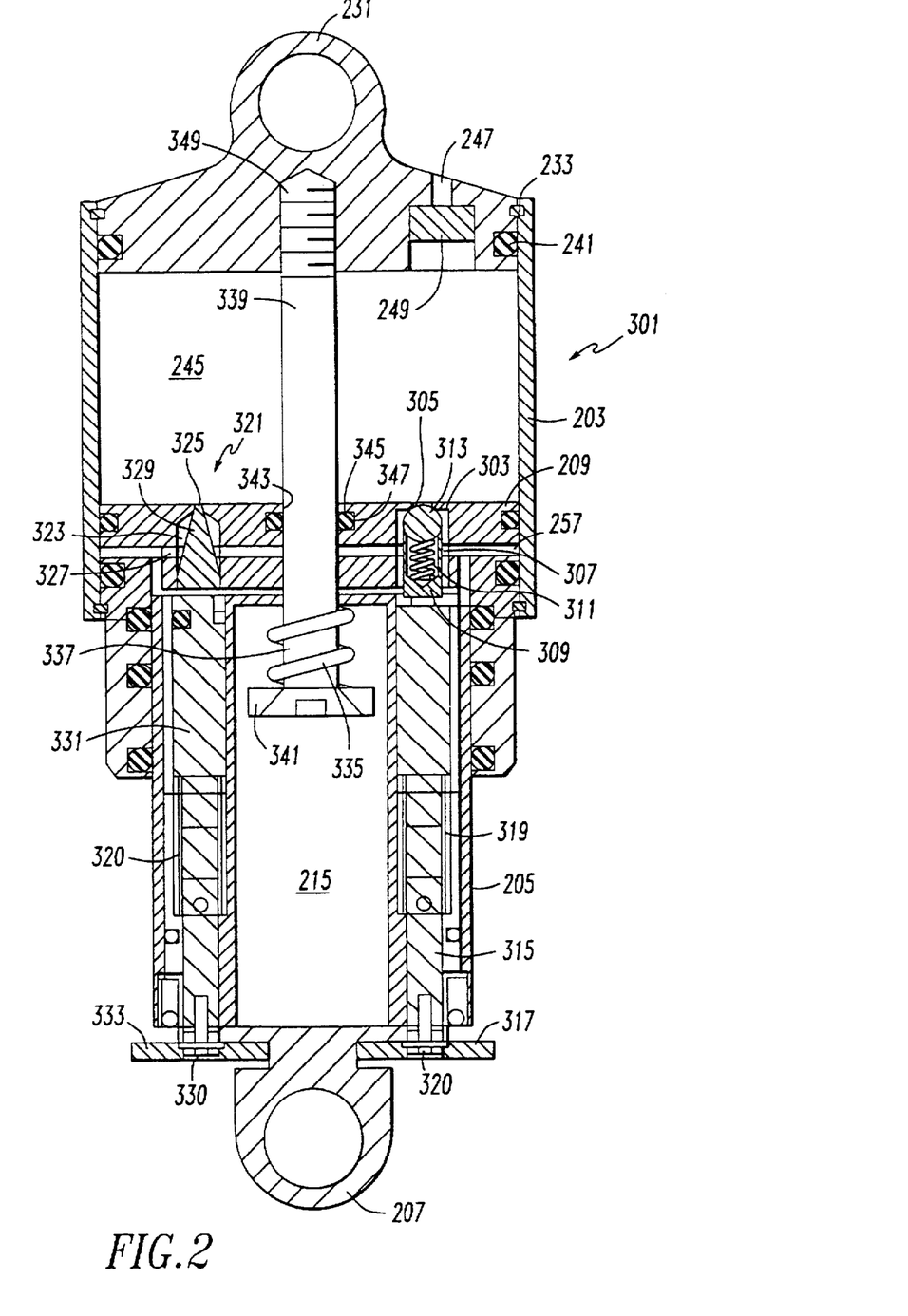
FIG. 2 is a sectional view of an alternative embodiment of the shock absorber in accordance with the present invention.

Referring now to FIG. 2, the shock absorber 301 is illustrated and is essentially identical to that of shock absorber 201 set forth in FIG. 1 with the exception of the following modifications. Adjustable controls are included in the housing 205 for regulating the compression and rebound characteristics of the shock absorber 301. The valve piston 209 includes an adjustable check valve 303 which only allows gas to flow therethrough in a direction coming from chamber 245 and traveling towards chambers 215 and 257. The preferred embodiment of the check valve 303 is a spring-loaded ball valve, but any adjustable valve which allows gaseous flow in only a single direction may be utilized. Valve piston 209 includes a passage 305 extending from chamber 245 to chamber 215, wherein passage 305 is also attached to a passageway 307 which connects chamber 257 to the passage 305. A valve retainer 309 is positioned within passage 305 for retaining a spring 311 and ball 313 therein. The spring 311 is attached to the valve retainer 309 on one end, and the spring 311 abuts the ball 313 on the opposite end, where the opening of passage 305 into chamber 245 is tapered so that the ball 313 is forced against the tapered opening in order to close the passage 305.

When eyelets 231 and 207 are forced toward each other during the encounter of a jolt by the shock absorber 301, the housing 205 is forced upward into the housing 203, resulting in the valve piston 209 being forced to travel toward eyelet 231 in the housing 203. The upward travelling valve piston 209 causes the pressure within the chamber 245 to increase due to the decreasing volume, while the pressure within the chamber 257 will decrease due to the increasing volume of the chamber 257. Once the pressure within chamber 245 becomes great enough to overcome the force being exerted by the spring 311 on the valve ball 313, then the check valve 303 will open allowing the gas within chamber 245 to pass through passage 305 and travelling valve piston 209 causes the already pressurized air or gas in chamber 245 to be forced into chambers 215 and 257. It is to be understood that the volume in chamber 245 decreases substantially more than the volume in chamber 257 increases. The exerted force of the spring 311 against the valve ball 313 governs how much force is exerted by chamber 245 to open the valve allowing the pressure to pass through passage 305 and into chambers 215 and 257.

The dampening and shock absorbing characteristics of the shock absorber 301 during compression can be adjusted by compression rod 315, which extends from the valve retainer 309 in the valve piston 209 to a compression knob 317 positioned outside of eyelet 207. The compression rod 315 extends through eyelet 207 and passes into the housing 205 so that the compression rod 315 is threadingly engaged with the housing 205 at 319. The threads 319 in the housing 205 allow the length of the compression rod 315 within the housing 205 to be adjusted by turning the compression rod 315 through the threads 319. The position of the valve retainer 309 can thus be changed by adjusting the length of the compression rod 315, since the valve retainer 309 is attached to the end of the compression rod 315. As the position of the valve retainer 309 is changed, so is the length of the spring 311 attached to valve retainer 309. The amount of force required to open the check valve 303 can thus be varied by changing the length of the spring 311, because the amount of force exerted on valve ball 313 is dependent upon the length of the spring 311. The compression rod 315 can be rotated by turning compression knob 317, which is attached to the compression rod 315 by securing device 320. Securing device 320 may comprise a screw or other similar fastening device.

Since check valve 303 will close upon the rebound of valve piston 209, rebound valve 321 is also provided for allowing the gas within chamber 215 and 257 to return to chamber 245. Valve piston 209 includes a tapered passage 323 extending from chamber 245 to chamber 215, whereby the passage 323 is tapered toward an opening 325 in valve piston 209 and the diameter of the passage 323 gets larger traveling from the chamber 245 toward chamber 215. The passage 323 is joined by a passageway 327 which extends from the chamber 257 to the passage 323. Rebound valve 321 further includes a tapered projection 329 which extends from the opening 325 to rebound rod 331, so that the tapered projection 329 increases in size as it extends from the opening 325 to the rebound rod 331.

The dampening characteristics of the shock absorber 301 during the rebound of the valve piston 209 can be adjusted by the rebound rod 331, which extends from the tapered projection 329 in the valve piston 209 to a rebound knob 333 positioned outside of eyelet 207. The rebound rod 331 extends through eyelet 207 and passes into the housing 205 so that the rebound rod 315 is threadingly engaged with the housing 205 at 320. The threads 320 in the housing 205 allow the length of the rebound rod 331 within the housing 205 to be adjusted by turning the rebound rod 331 through the threads 320. The position of the tapered projection 329 can thus be changed by adjusting the length of the rebound rod 331, since the tapered projection 331 is attached to the end of the rebound rod 331. The amount of gas permitted to travel through opening 325 can thus be adjusted by varying the amount by which tapered projection 329 in inserted into opening 325. The opening 325 can be completely shut by inserting tapered projection 329 into the passage 323 until the tapered projection 329 abuts valve piston 209, or can be opened to the desired size by adjusting the degree to which tapered projection blocks the opening 323. The rebound rod 331 can be rotated by turning rebound knob 333, which is attached to the rebound rod 331 by a securing device 330.

The shock absorber 301 further includes a negative spring 335 which is utilized to manipulate the true spring rate of the shock absorber and to prevent the shock absorber from "banging" when reaching its full extension. The spring 335 is retained against the valve piston 209 by a bolt 339, wherein the spring 335 is coiled around the shaft 337 of the bolt 339. The spring 335 exerts a force on its one end against the head 341 of the bolt while the opposite end of the spring 335 exerts the spring force against valve piston 209. The head 341 of the bolt 339 is positioned within the chamber 215, and the shaft 337 passes through an opening 343 in valve piston 209. An annular recess 345 is formed on the interior surface of the valve piston 209 for retaining an annular seal 347 therein in order to prevent the flow of gas between the shaft 337 of the bolt 339 and the valve piston 209. The bolt 339 further extends through chamber 245 and is secured into eyelet 231 through a depression 349 in the eyelet 231.

Again, as with the air sprung shock absorber set forth in FIG. 1, when the bicycle encounters a shock, the shock is initially transferred to the shock absorber such that the valve piston 209 travels upwardly thereby decreasing the overall volume of the shock absorber and consequently pushing air or gas pressure from chamber 245 to chambers 215 and 257. Again, as with the previous embodiment, once the valve piston. 209 reaches its furthest most position, the effective forces acting on valve piston 209 within the compression chamber 245 are significantly greater than those forces acting on the valve piston in chambers 215 and 257 thus springing the valve piston 209 back towards its rest position thereby achieving an air sprung or gas sprung shock absorber. Upon initial movement of the valve piston 209 towards its rest position, the pressure within chamber 245 such that the effective forces acting on the valve piston 209 substantially instantaneously drop to approximately the effective forces acting against the piston within chamber 257 wherein the pressurized air or gas within chamber 215 passes through the orifice 325 in the valve piston 209 and into compression chamber 245 thus controlling the rebound stroke of the valve piston. Accordingly, an air sprung and air dampened shock absorber is achieved wherein both the compression and rebound strokes of the shock absorber are controlled.

Figures 3, 4:
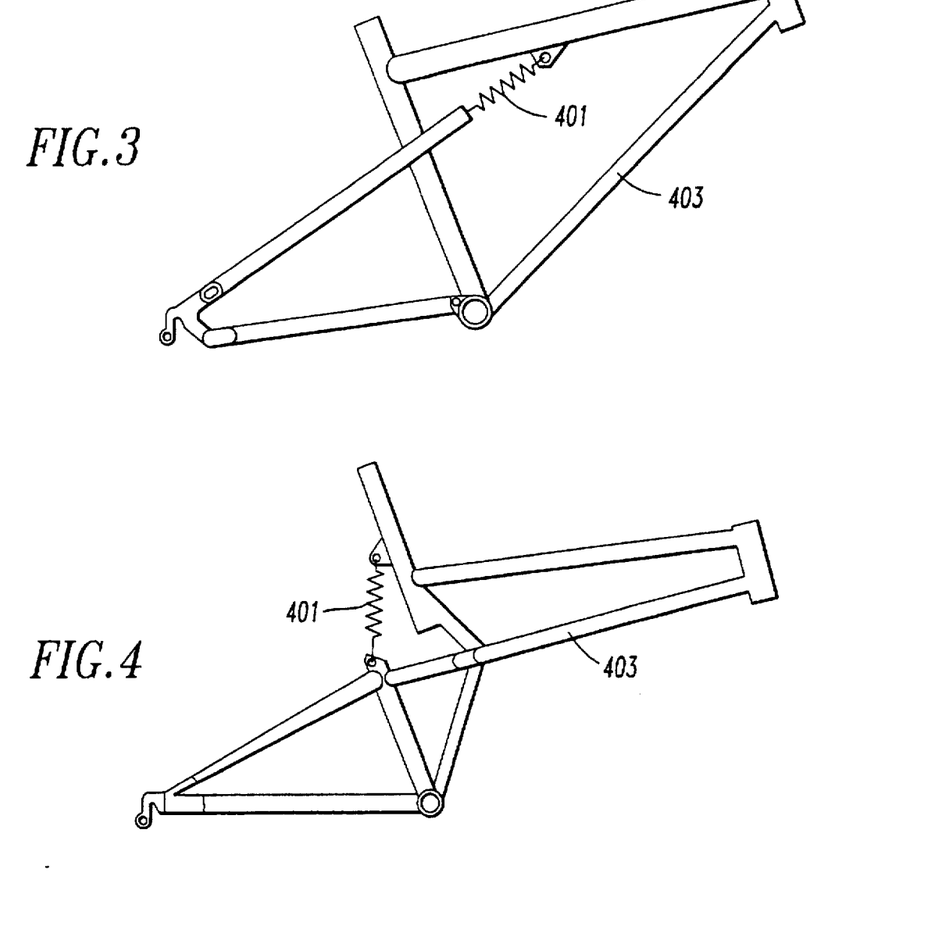
FIGS. 3, 4 and 5 illustrate the positioning of the shock absorber illustrated in FIG. 1 or 2 with respect to the bicycle frame.
Figure 5:
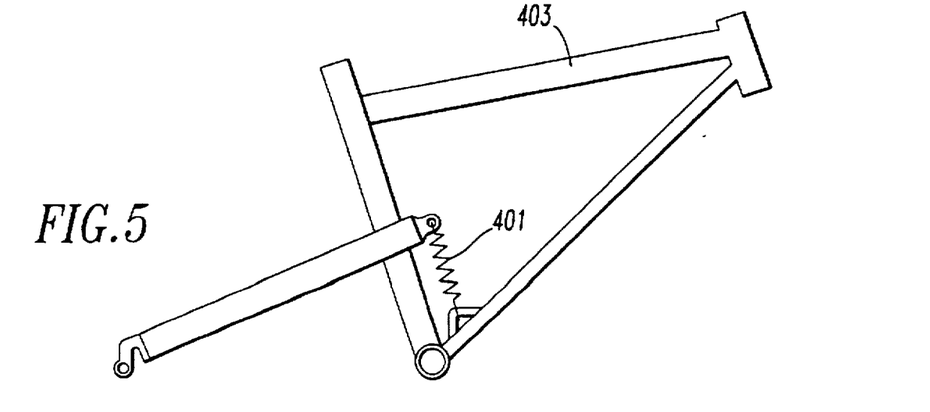

The ability of the shock absorbers illustrated in FIGS. 1 and 2 to not only dampen the compression and rebound characteristics of the valve piston 209 but to also permit the shock absorber to quickly compress when encountering large shocks allows it to be best used on the rear of a bicycle frame. As illustrated in FIGS. 3, 4 and 5, the shock absorber 401 is illustrated in various positions as connected to a bicycle frame 403. However, it is understood that the shock absorber 401 may be connected to the bicycle frame 403 in any manner which allows it to function as described above.

Figures 6, 7:
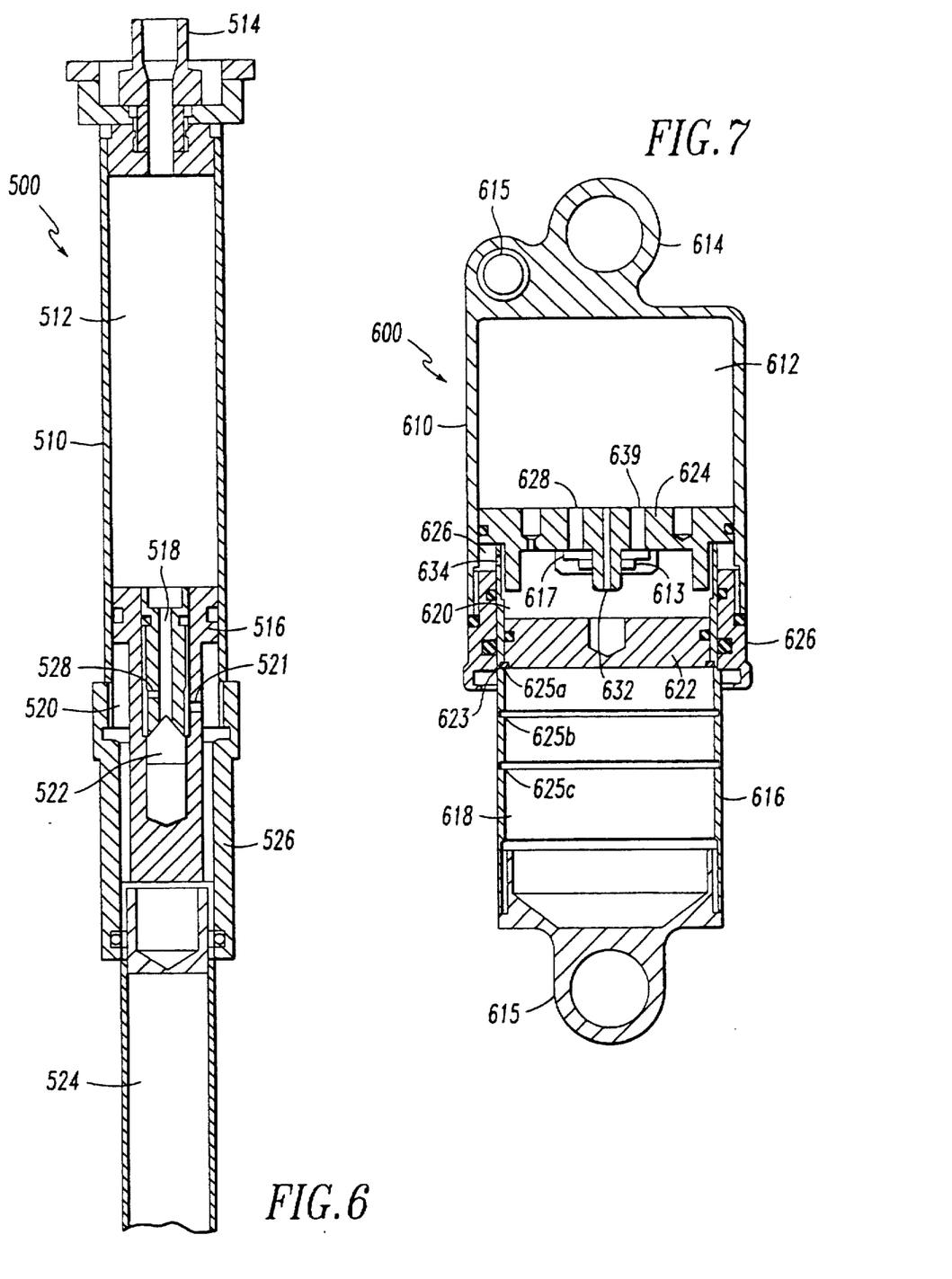
FIG. 6 is a cross-sectional view of a front fort shock absorber in accordance with an alternative embodiment of the present invention.
FIG. 7 is a cross-sectional view of a shock absorber in accordance with an alternative embodiment of the present invention.

The shock absorber in accordance with yet another embodiment of the present invention is illustrated in FIG. 6 which is for the front fork of a bicycle. The shock absorber 500 includes a main housing 510 which forms therein a compression chamber 512 which is pressurized with air or gas through the pressurizing mechanism 514. The pressurizing mechanism 514 seals an upper portion of the compression chamber 512 in a manner similar to that discussed hereinabove.

Extending into an opposing end of the housing 510 is a piston 516 which sealingly engages an inner surface of the housing 510. The piston 516 includes therein a passage 518 which permits the passage of pressurized air or gas from the compression chamber 512 to a rebound chamber 520 through passage 521 by displacing the valve 522. The valve 522 is positioned within the piston 516 and is biased towards a closed position. The piston 516 is threadingly received by a stem or shaft 524 which is sealingly coupled with the housing 510 by way of seal head 526. Also formed in the piston 516 is a rebound orifice 528 which communicates between the passage 518 and rebound chamber 520, the details of which will be described in detail hereinbelow.

The construction referred to hereinabove forms an air sprung front fork shock absorber similar to that of the rear shock absorbers discussed hereinabove for use on bicycles wherein upon compression of the fork due to the terrain on which the bike is traveling, the piston 516 travels upwardly within the housing 510 further pushing the already pressurized air or gas within the compression chamber 512 toward chamber 520. During this compression stroke, pressurized air or gas passes through the passage 518 past valve 522 through passage 521 and into the rebound chamber 520 wherein the pressurized air or gas within this chamber is further pressurized due to the total volume change of the shock absorber. Initially, it is noted that prior to the compression stroke, the pressurized air or gas within the compressing chamber 512 and the rebound chamber 520 are substantially equal.

Once the stem 524 drives the piston 516 into the housing 510 to the extent the terrain dictates, the pressurized air or gas will be forced through the valve 522 and into chamber 520. It is noted that the pressure of the pressurized air or gas within the chamber 512 will be forced into the rebound chamber 520, thus dictating the dampening characteristics of the shock absorber. Once in the compressed state and stopped, the piston 516 is initially air or gas sprung toward its original position by the effective forces acting on the piston 516 within the compression chamber. This initial reverse movement causes the pressure of the air or gas within the compression chamber 512, which is assumed to be equal to the air or gas pressure in rebound chamber 520, to decrease dramatically such that the forces acting on the piston 516 from within the chamber 512 substantially instantaneously approximately equal the effective forces acting on the piston 516 from within the rebound chamber 520. In this regard, now air or gas pressure from within the rebound chamber 520 passes through the rebound orifice 522 in a controlled manner dictated by the size of the orifice 528, thus bringing the piston 516 back to its rest position. Accordingly, an air or gas sprung and dampened shock absorber is achieved.

Referring now to FIG. 7, yet another embodiment of the present invention will now be described in detail. Therein, a shock absorber which is generally adapted to absorb impact on the rear wheel of a bicycle is illustrated. The shock absorber 600 includes a main housing 610 containing therein a compression chamber 612. In this case, the compression chamber 612 is substantially integral with the eyelet 614, however, an air valve 615 is provided in order to pressurize the air or gas within the chamber 612. Telescopically received with the housing 610 is housing 616 which includes a void region 618 and a rebound chamber 620 which are separated by a valve plate 622. The valve plate 622 is sealingly received within the housing 616 so as to reduce the effective volume of the shock absorber to an extent less than the overall volume which can be achieved in the void 618. The valve plate 622 is secured in position by ring 623 such that the position of the valve plate 622 can be positioned by any of the notches 625a, 625b or 625c. Secured to the housing 616 is a piston 624 which sealingly engages an inner surface of the housing 610. Further, a sealing head 626 is provided so as to form an airtight seal between an outer surface of housing 616 and an inner surface of housing 610. The piston 624 further includes passages 628 and 630 which communicate between the compression chamber 612 and the rebound chamber 620 and permit the passage of pressurized air or gas from the compression chamber 612 to the rebound chamber 620, however, passage of pressurized air or gas from the rebound chamber 620 to the compression chamber 612 is blocked by way of a one-way valve 613 including a resilient sealing member 617. Also provided in the piston 624 is a rebound orifice 632 which permits the passage of pressurized air or gas from the rebound chamber 620 to the compression chamber 612. Additionally, provided in the housing 616 adjacent the piston 624 is a bleed orifice 634 which permits the passage of pressurized air or gas into an auxiliary chamber 636 formed between the housing 616 and housing 610.

Similar to the previous embodiments, the aforementioned structure forms an air or gas sprung and dampened shock absorber for the rear wheel of a bicycle wherein upon contact with rough terrain causes the housing 616 to travel into the housing 610 and thus displace the piston 624 into compression chamber 612. In doing so, the pressurized air or gas within the compression chamber 612 which is initially in equilibrium with the pressurized air or gas within the rebound chamber 620 is transferred by way of passages 628, 630 and 632 past valve 627 into the rebound chamber 620 and 636 in that chamber 620 and 636 are in continuous communication with one another. As with the previous embodiments, once the compression stroke of the shock is dampened by the restricted flow of the pressurized air or gas in the compression chamber 612 passing through the passages 628, 630 and 632, the piston stops its forward movement and the true spring rate is that of the pressure of the pressurized air or gas in the compression chamber 612 multiplied by the cross-sectional area of the shaft 616 assuming that the chambers are at equal pressures. Subsequently, upon initial return of the piston 624, the pressure of the pressurized air or gas in compression chamber 612 substantially instantaneously drop to equal the effective forces acting against the piston 624 from within chamber 636 such that the now pressurized air or gas in the rebound chamber 620 pass into the compression chamber 612 by way of orifice 632 thus returning the piston 624 to its rest position thereby achieving an air or gas sprung and dampened shock absorber.

By way of example, it is noted that starting with an initial pressure of 180 PSI within each of the compression chamber 612 and rebound chamber 620 at rest and compressing the shock absorbers such that the piston travels approximately 1.5 inches into the compression chamber 612, the pressure within the compression chamber 612 escalates to approximately 850 PSI. In doing so, the air or gas pressure is passed into the rebound chamber where a substantially equal pressure is achieved. Once displacement of the piston 624 stops, and reverse movement is initiated due to the greater forces acting on the piston in the compression chamber as compared to those forces acting against the piston in the rebound chamber thus springing the piston 624 back towards the rest position. Upon initial return movement of the piston 624, the pressure within the compression chamber 612 drops dramatically such that the forces therein substantially instantaneously approximately equal those in the rebound chamber wherein the pressurized air within the rebound chamber 620 passes through the orifice 632 thus controlling the rebound of the piston 624 back to its original position. Accordingly, with the aforementioned construction, an air sprung and dampened shock absorber for the rear wheel of a bicycle is achieved.

Figure 8:
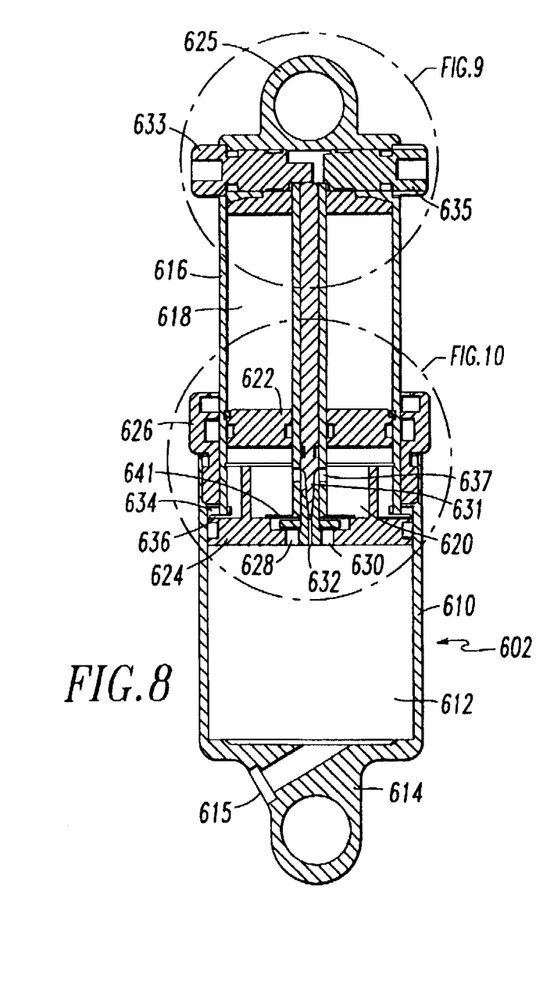
FIG. 8 is a cross-sectional view of an adjustable shock absorber in accordance with an alternative embodiment of the present invention.
Figure 9:
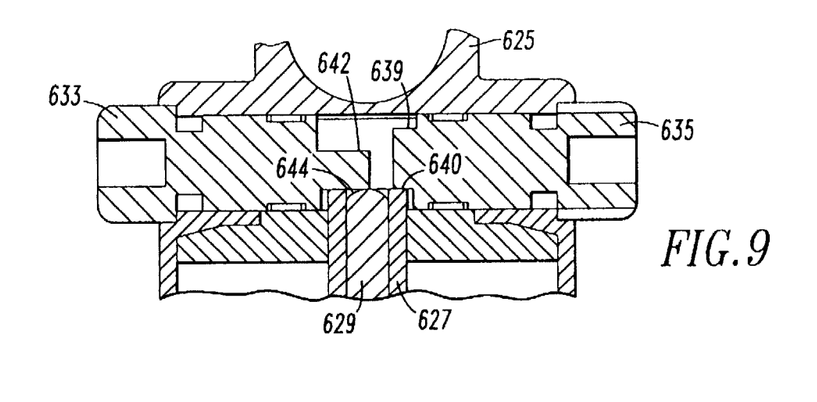
FIG. 9 is an expanded view of Section A of FIG. 8.
Figure 10:
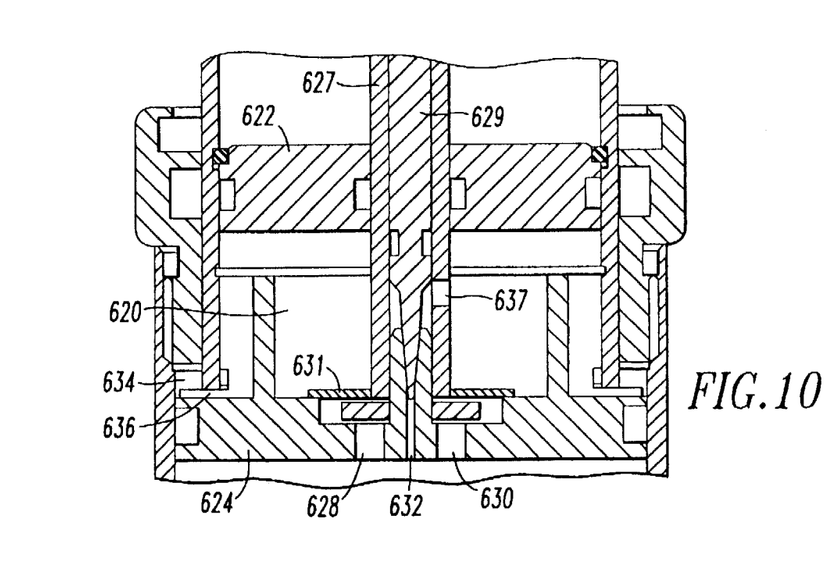
FIG. 10 is an expanded view of Section B of FIG. 8.

Yet another embodiment of the present invention is illustrated in detail in FIG. 8 and expanded detail in each of FIGS. 9 and 10. Similar to the previous embodiments, wherein like reference numerals will be used to designate like components, the shock absorber 602 includes a housing 610 having formed therein a compression chamber 612. Closing off the compression chamber 612 is an inlet cap 614 formed therein a pressurizing orifice 615. Telescopically received within the housing 610 is shaft 616 which includes a void region 618. Also formed within the shaft 616 is a rebound chamber 620 and secondary rebound chamber 634 which is defined by a valve plate 622 and an inner surface of a piston 624. The chambers 620 and 634 communicate with one another by way of passage 636. Like the previous embodiment, the piston 624 is fixedly secured to the shaft 616 and sealingly engages an inner surface of a housing 610. It is noted that the position of the valve plate 622 may be adjusted in order to change the overall volume of the shock absorber. Further, the shaft 616 and housing 610 are sealingly engaged with one another by way of seal head 626 which sealingly engages an outer surface of the shaft 616 and an inner surface of the housing 610.

Formed within the piston 624 are at least two passages 628 and 630 which form one-way communication between the pressurized air or gas within the compression chamber 612 and the pressurized air or gas within the rebound chambers 620 and 634. Positioned adjacent the passages 628 and 630 is a flapper valve 641 which permits the one-way passage of pressurized air or gas. Also formed within the piston 624 is passage 632 which provides pressurized air or gas communication between the chambers 612, 620 and 621. Unlike the previous embodiment, the embodiment illustrated in FIG. 8 includes an adjustability feature which allows for the adjustable control of the rebound stroke of the shock absorber. Positioned between the piston 624 and end cap 625 is a substantially cylindrical tube 627 which receives therein a rebound rod 629. At a first end of the rebound rod 629 is provided a tapered end 631 which extends into a cooperating tapered end of the passage 632. The extent to which the tapered end 631 extends into the passage 632 is adjusted by way of positioning element 633. Also provided within the cylindrical tube 627 is a communication port 637 which permits pressurized air or gas within the rebound chamber 620 to return to the compression chamber 612 by way of regulated passage 632.

With reference to FIGS. 9 and 10, the adjustability and operation of the shock absorber illustrated in FIG. 8 will now to described in greater detail.

Referring to FIG. 9, the positioning of the cylindrical tube 627 and rebound rod 629 is carried out by way of adjustment elements 633 and 635 as noted hereinabove. Initially, the adjustment element 635 is received within a bore formed in the cap 625 with the adjustment element at 635 being rotatable therein. An exposed end of the adjustment element 635 includes an adjustment knob which permits the element 635 to be readily rotated while the remote end of the adjustment element 635 includes cam surfaces, two of which are illustrated as surfaces 639 and 640. Each of these surfaces are positioned a different distance from an outer limit of the adjustment element so as to contact the end of the cylindrical tube 627 and position the tube with respect to the valve 641.

Similarly, the adjustment element 633 includes an exposed end which permits the element to be readily rotated while at a remote end includes cam surfaces, two of which are illustrated as surfaces 642 and 644. Similarly, the distance at which the surfaces are positioned away from an outer parameter of the adjustment element varies for each surface such that rotation of the element places a selected surface adjacent an opening in the cylindrical tube 627. As illustrated in FIG. 9, the rebound rod 629 contacts the surface 644 which positions the rebound rod 629 with respect to the cylindrical tube 627. The significance of the positioning will be described in greater detail hereinbelow with respect to FIG. 10.

Referring now to FIG. 10, it can be seen that the tapered end 631 of the spindle 629 received within the cylindrical tube 627 is positioned relative to the tapered opening end passage 632 by way of adjustment element 633. Depending upon the surface of the adjustment element 633 chosen, the spacing between the tapered end 631 of the spindle 629 with respect to the tapered opening of the passage 632 can be readily adjusted. By adjusting this spacing, the rebound characteristics of the shock absorber can be readily adjusted and controlled. In this regard, as can be seen from FIG. 10 when the shock absorber is compressed due to the bicycle traveling on a rough terrain, the piston 624 travels into the housing 610 thus forcing the already pressurized air or gas within the compression chamber 612 through the passage ways 628 and 630, past valve 641 and into the rebound chamber 620 and 634. Again, as discussed hereinabove, the overall volume of the shock absorber is readily controlled by way of the valve plate 622.

Once the piston has reached its furthest most point within the compression chamber 612 and pressurized air and gas has passed into the rebound chamber 620 dictated by the shock the bicycle receives, the piston stops at which time movement of the piston in the reverse direction is initiated by the pressurized gas within the compression chamber 612 which generates forces which are greater than those generated in the rebound chamber 620 resulting in an air or gas sprung shock absorber. Once the rebound stroke is initiated, the pressure within the chamber 612 decreases dramatically such that the effective forces acting on the piston 624 from within the chamber 612 substantially instantaneously approximately equal the effective forces acting on the piston 624 from within the chambers 620 and 634 wherein pressurized air or gas within the rebound chamber 620 and chamber 634 pass through the communication port 637, past the tapered end 631 of the rebound rod 629 and into the compression chamber 612 by way of passage way 632. In this regard, an air sprung and dampened shock absorber having controlled compression and rebound strokes is achieved for the rear wheel of a bicycle.

Referring now to FIGS. 11–14, a preferred embodiment of the present invention will now be described in greater detail hereinbelow.

Figures 11, 11A:
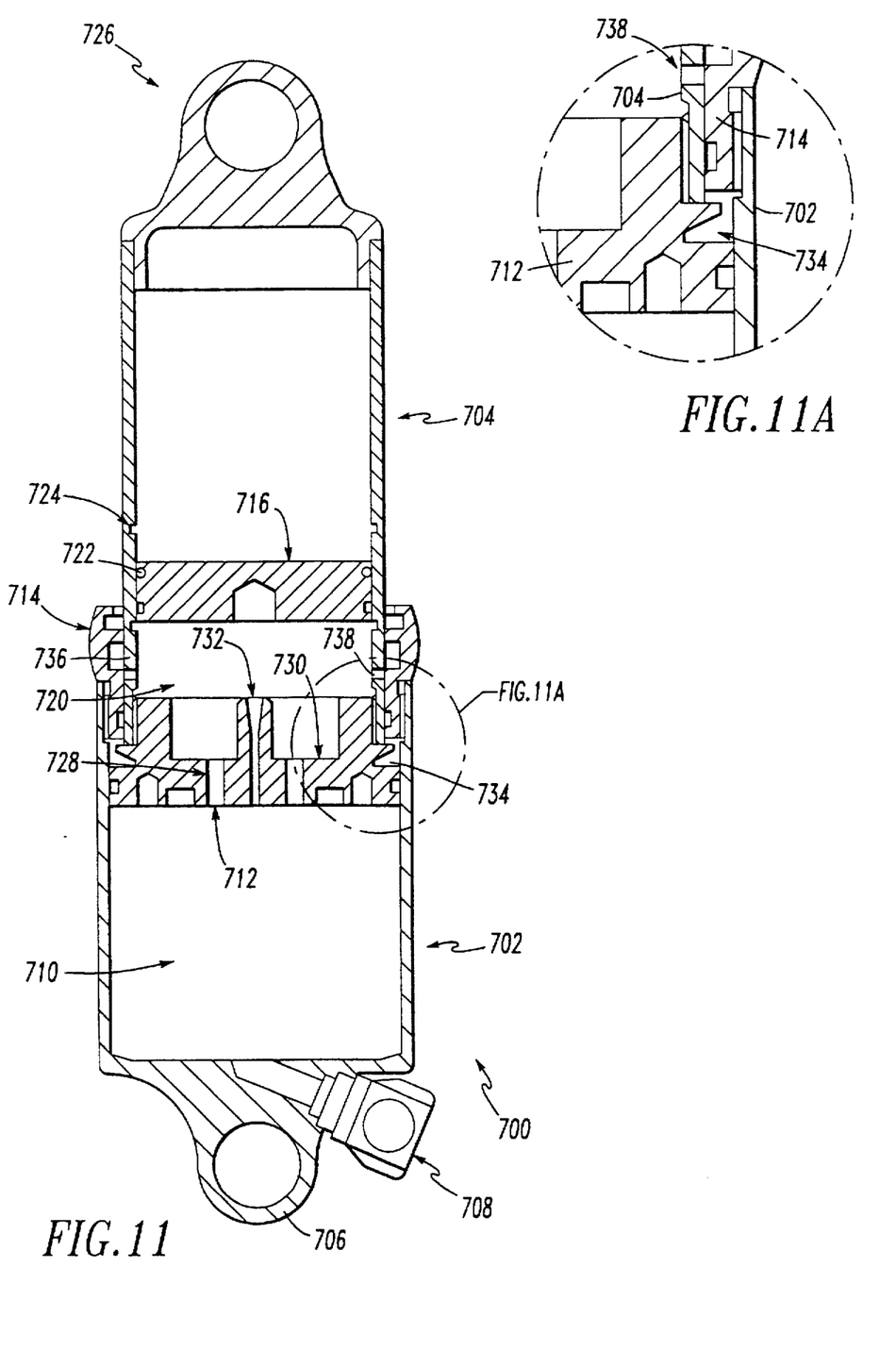

The shock absorber 700 illustrated in FIG. 11 includes a cylindrical housing 702 which receives telescopically therein a shaft 704. The cylindrical housing 702 is closed at a first end by an eyelet 706 which includes a pressurizing means 708 which permits the shock absorber to be initially pressurized to a predetermined pressure. The housing 702 includes a compression chamber 710 which sealingly receives a valve piston 712 fixedly secured to an innermost end of the shaft 704. The shaft 704 is sealed with respect to the housing 702 by way of a seal head 714 similar to that discussed hereinabove with respect to the previous embodiments. Also secured to an inner surface of the shaft 704 is a valve plate or compression plate 716 which is axially moveable so as to vary the total shock volume as with the previous embodiments. The valve plate 716 sealingly engages an inner surface of the shaft 704 and is readily positioned in one of a plurality of positions by way of positioning ring 722. This positioning ring can be received in any one of recesses 724 formed in an inner surface of the shaft 704. Further, like the previous embodiments, the shaft 704 is closed at a second end thereof by way of eyelet 726. The valve piston 712 includes passages 728 and 730 formed therein which were readily sealed off by a one-way valve similar to that set forth in the previous embodiment. Additionally, formed in the valve piston 712 is a rebound orifice 732 which controllably passes air pressure or gas pressure therethrough during the rebound stroke of the shock absorber.

Unlike the previous embodiment, this embodiment includes a negative air spring chamber 734 (this chamber being similar to the secondary rebound chamber referred to hereinabove) which communicates with the rebound chamber 720 by way of passages 736 and 738. This feature being best illustrated in FIG. 11A which is an expanded view of Section A of FIG. 11. As can be seen therein, when the shock absorber 700 is in the rest position having the negative air spring chamber 734 in its compressed state, that being the position illustrated in FIG. 11, the passage 738 does not communicate with the negative air spring chamber 734. Consequently, the pressurized air or gas initially communicated to the rebound chamber 720 will be trapped in the negative air spring chamber 734 in the fully collapsed state.

Figures 12, 12A:
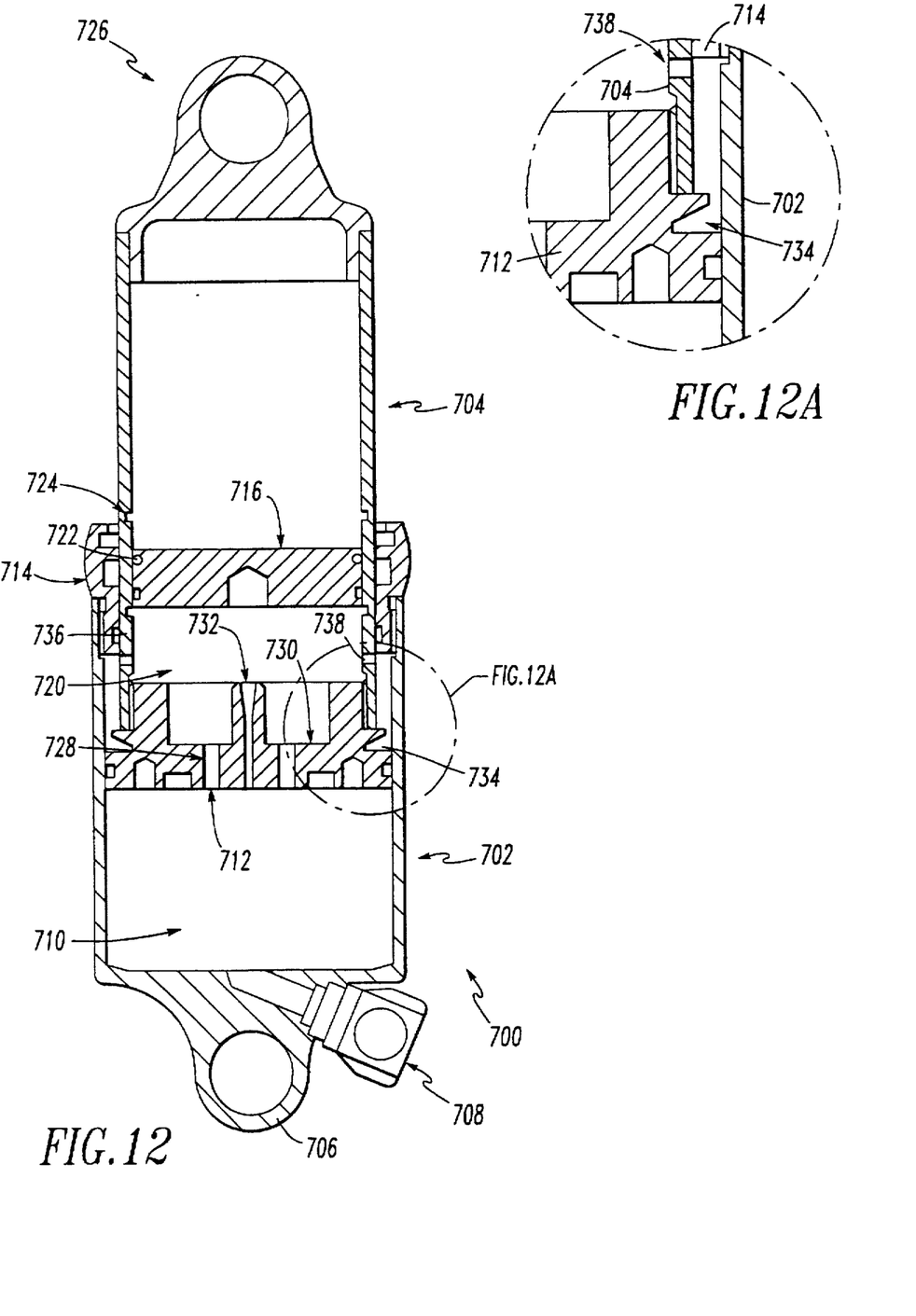
FIG. 12 is a cross-sectional view of the shock absorber of FIG. 11 illustrated in the partially compressed state.
FIG. 12A is an exploded view of section B of FIG. 12.

Referring now to FIG. 12 wherein like reference numerals are utilized to designate like parts, the shock absorber 700 is illustrated in a partially compressed state. Therein, the shaft 704 has begun to reciprocate into the housing 702, starting to transfer the already pressurized air or gas present in compression chamber 710. During the compression stroke, the air or gas pressure passes through passages 728, 730 and 732 formed in the valve piston 712 thereby likewise compressing the already pressurized air or gas within the rebound chamber 720 due to the decrease in the overall shock volume. As can be seen from FIG. 12, and as is better illustrated in FIG. 12A, the passages 736 and 738 have at this point begun to pass the seal head 714 thus permitting gas or air pressure within the rebound chamber 720 to pass through such passages and into the negative air spring chamber 734 to form a separate air chamber. As can be appreciated from FIGS. 11, 12 and 13, the volume of the negative air chamber 734 continues to expand while the volume of the compression chamber 710 continues to contract. It should further be noted that the volume of the rebound chamber 720 become a partner with the negative air spring chamber 734.

Figure 13:
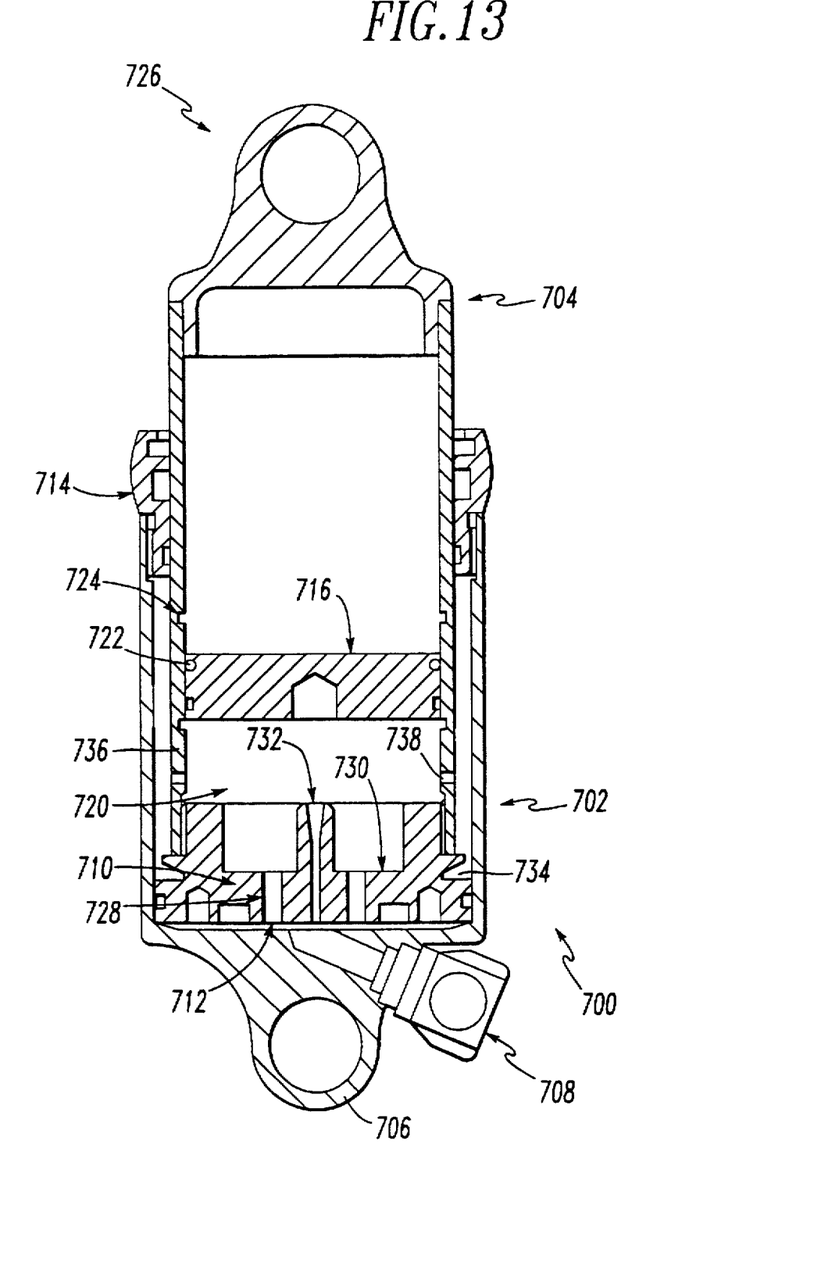
FIG. 13 is a cross-sectional view of the shock absorber of FIG. 11 illustrated in the fully compressed state.

Referring now to FIG. 13 wherein the shock absorber 700 is illustrated in its substantially fully compressed state, it can be readily appreciated that the volume of the compression chamber 710 has decreased significantly while the volume of the negative air spring chamber 734 has increase significantly. At this point, the forces acting on the piston 712 from within the compression chamber 710 are significantly greater than those forces acting on the piston 712 from within the negative air spring chamber 734. Accordingly, as with the previous embodiments, initial movement of the valve piston 712 back to the rest position illustrated in FIG. 11 is initiated by the forces acting on the piston 712 within the compression chamber 710 thus resulting in an air sprung shock absorber.

As with the previous embodiments, once the valve piston 712 of the shock absorber begins its return toward the rest position, the pressure of the pressurized air or gas within the chamber 710 decreases dramatically such that the effective forces acting on the piston 712 within the chamber 710 substantially instantaneously drops to approximately equal the effective forces acting on the piston from within the chamber 734. In this case, the pressurized air or gas within the chambers 720 and 734 will dissipate through the rebound orifice 732 and into the compression chamber 710 so as to control the rebound stroke of the shock absorber. Likewise, pressurized air or gas within the chamber 734 will likewise escape through the passages 736 and 738 into the rebound chamber 720. This will continue until the position illustrated in FIG. 12 is again reached wherein the passages 736 and 738 begin to be sealed off by the seal head 714. At this point, the pressurized air or gas within the negative air spring chamber 734 is trapped and consequently cannot be dissipated any longer into the rebound chamber 720. Consequently, as the valve piston 712 continues its rebound stroke, the pressurized air or gas within the negative air spring chamber 734 begins to compress with this sealing off of the chamber 734.

A specific example of the pressures realized in accordance with the present invention will now be described in detail with reference to the structure of the shock absorber set forth in FIGS. 11–13. Specifically, a shock absorber having the dimensions set forth in Table I was manufactured in order to confirm the operation of the shock absorber illustrated in FIGS. 11–13.

TABLE I

| | Dia. | AREA | STROKE | TOTAL VOLUME |
|---|---|---|---|---|
| Shaft | 1.5 | 1.76715 | 1.5 | 2.65072 |
| Cylinder | 1.732 | 2.35606 | 1.58 | 3.72257 |
| Secondary Rebound Chamber | 0.984 | 0.76047 | 0.394 | 0.29962 |
| Rebound Chamber | 0.562 | 0.24806 | 0.63 | |
| | 0.312 | 0.07645 | 0.63 | |
| Compression Ports | 0.12 | 0.01131 | 0.905 | 0.04094 |
| Spanner Hole | 0.125 | 0.01227 | 0.905 | 0.04442 |
| | | | Total | 4.21567 |
| Rebound Cross Section | | 0.58891 | 0.4 | 0.23556 |
| Rebound Force @ 538.7 psi | 317.246 | | | |
| O-ring | 0.07 | 0.00385 | | 0.018885 |
| Initial Pressure | 200 | | | |

As can be seen from the foregoing Table, each of the compression chamber 710 and rebound chamber 720 are initially pressurized to a pressure of 200 psi. The main goal of the negative air spring chamber is to change the air spring rate and also act as a top out for the shock absorber. The following tables illustrate a typical air spring rate when utilizing a shock absorber without the negative air spring chamber (Table II) and the manipulative spring rate calculations when a negative air spring chamber is utilized (Table III). Also the overall reduction in the shock volume and increase in pressure, Table IV and the effect of the negative air spring chamber, Table V.

TABLE II

TYPICAL AIR SPG. RATE

| Stroke in inches | Force in pounds: |
|---|---|
| 0 | 353.4292 |
| 0.05 | 360.9954 |
| 0.1 | 368.8926 |
| 0.15 | 377.1431 |
| 0.2 | 385.7711 |
| 0.25 | 394.893 |
| 0.3 | 404.2681 |
| 0.4 | 424.6283 |
| 0.5 | 447.148 |
| 0.6 | 472.1902 |
| 0.7 | 500.2036 |
| 0.8 | 531.7506 |
| 0.9 | 567.5447 |
| 1 | 608.5054 |
| 1.1 | 655.8385 |
| 1.2 | 711.1563 |
| 1.3 | 776.6655 |
| 1.4 | 855.4682 |
| 1.5 | 952.0678 |

TABLE III

MANIPULATED SPRING RATE CALCULATIONS

| Stroke in inches | Force in pounds: |
|---|---|
| 0 | 2.575493269 |
| 0.05 | 97.85510285 |
| 0.1 | 158.3803843 |
| 0.15 | 201.7162333 |
| 0.2 | 235.4051872 |
| 0.25 | 263.2329073 |
| 0.3 | 404.2680925 |
| 0.4 | 424.6282701 |
| 0.5 | 447.1480116 |
| 0.6 | 472.1901505 |
| 0.7 | 500.2036231 |
| 0.8 | 531.7506206 |
| 0.9 | 567.5447064 |
| 1 | 608.5054409 |
| 1.1 | 655.838499 |
| 1.2 | 711.156335 |
| 1.3 | 776.6655372 |
| 1.4 | 855.4682408 |
| 1.5 | 952.0677544 |

TABLE IV

OVERALL SHOCK VOLUME REDUCTION

| Volume | Pressure |
|---|---|
| 4.21567 | 200 |
| 4.127315 | 204.2816 |
| 4.038957 | 208.7505 |
| 3.9506 | 213.4193 |
| 3.862243 | 218.3018 |
| 3.773886 | 223.4128 |
| 3.685528 | 228.7689 |
| 3.508814 | 240.2904 |
| 3.332099 | 253.034 |
| 3.155384 | 267.205 |
| 2.97867 | 283.0573 |
| 2.801955 | 300.9093 |
| 2.625241 | 321.1646 |
| 2.448526 | 344.3436 |
| 2.271812 | 371.1287 |
| 2.095697 | 402.4322 |
| 1.918382 | 439.5028 |
| 1.741668 | 484.096 |
| 1.564953 | 484.096 |

TABLE V

EFFECT OF NEGATIVE AIR SPRING CHAMBER

| Negative Reb Prog. | Negative Reb Prog. | Pressure | Force in NASC |
|---|---|---|---|
| 0 | 0.23556 | 223.4128 | 131.5701301 |
| 0.05 | 0.206119 | 255.3289 | 150.365863 |
| 0.1 | 0.176673 | 297.8838 | 175.4268401 |
| 0.15 | 0.147228 | 357.4605 | 210.5122082 |
| 0.2 | 0.117782 | 446.8256 | 263.1402602 |
| 0.25 | 0.888337 | 595.7675 | 350.8536803 |

As can be seen from the foregoing calculations, the spring rate of the shock absorber is significantly less during the initial stroke of 0.25" wherein in the spring rate increases at a slower rate, however, once the passages 736 and 738 are exposed to permit communication between the rebound chamber 720 and negative air spring chamber 734, the negative air spring chamber 734 merely becomes a secondary rebound chamber thus reverting the spring rate calculations back to those where a negative air spring chamber is not present. Accordingly, while the negative air spring chamber acts as a top out to lessen the spring rate of the shock absorber during the initial compression stroke. It can be noted that the initial pressure of the shock absorber set forth hereinabove is 200 psi, however, the operation of the negative air spring chamber as well as the overall performance of the shock absorber may be readily changed by either raising or lowering the initial pressure of the shock absorber.

Figure 14:
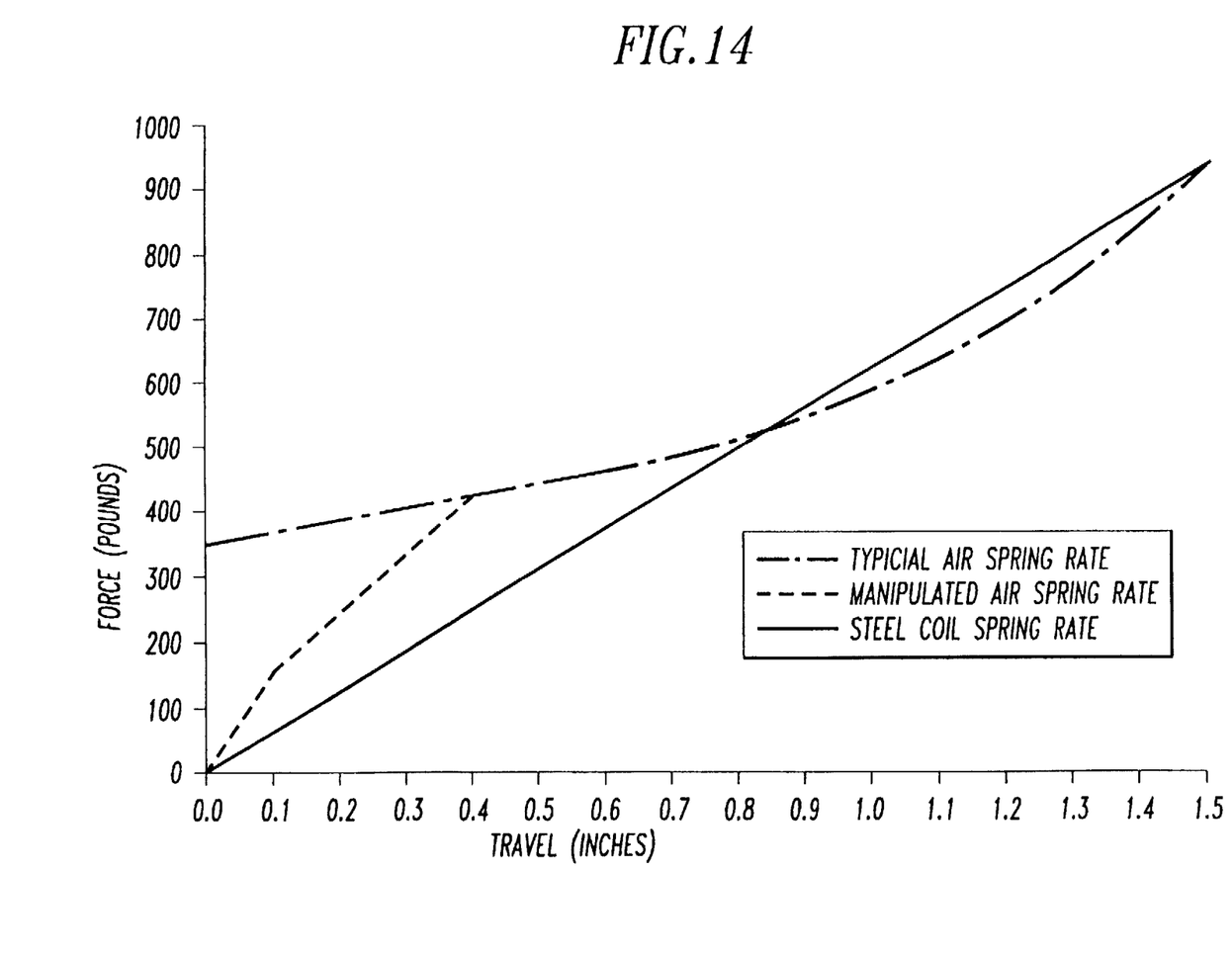
FIG. 14 is a graphic illustration of the manipulated spring rate achieved in accordance with the present invention.

Referring now to FIG. 14, the spring curve set forth therein compares with that which is achieved by the manipulated air spring rate caused by the negative air spring chamber and at of the air spring rate as each of these compare to a steel coil spring. In this regard, and in accordance with applicant's claimed invention, bicycles utilizing the shock absorber set forth herein will have less tendency to bob up and down while pedaling. That is, with the manipulated air spring rate, there is a quick rise in the spring force before the manipulated air spring shock absorber conforms to that of a shock absorber not including the negative air spring chamber. Thus, the rider will be provided with a more comfortable ride than as previously achieved. Further, it should be noted that the forgoing description of the preferred embodiment of the present invention has been described with reference to a rear wheel shock absorber, however the same concept may be adapted for use in a front fork shock absorber.

As can be seen from the foregoing, a shock absorber manufactured in accordance with the present invention will provide a dampening system used to control the compression and rebound dampening characteristics which utilizes a gas or air damping medium that does not loose viscosity under high temperature conditions, does not vary its dampening characteristics with temperature fluxuations, and does not create a messy environment if a leak develops. Moreover, by manufacturing the shock absorber in accordance with the present invention, a pressure adjusting feature is provided which allows the dampening characteristics of the shock absorber to be variably controlled for particular surface conditions.

While the present invention has been described with reference to the preferred embodiment, it will be appreciated by those skilled in the art that the invention may be practiced otherwise then as specifically described herein without departing from the spirit and scope of the invention. It is, therefore, to be understood that the spirit and scope of the invention be limited only by the appended claims.

What is claimed is:

1. A gas sprung and pressure dampened shock absorber utilizing compressed gas for dampening comprising:

a cylinder having a closed end and an open end forming a compression chamber;

a shaft having a closed end and an open end; said open end of said shaft being reciprocally received within said cylinder through said open end of said cylinder for contracting and expanding said compression chamber during compression and rebound strokes of the shock absorber;

a piston sealingly positioned in said open end of said shaft and slidably and sealingly positioned adjacent an inner surface of said cylinder forming a rebound chamber in said shaft; and a negative gas spring chamber formed between an outer surface of said shaft and said inner surface of said cylinder, said negative gas spring chamber expanding and contracting inversely relative to said compression chamber;

wherein said negative gas spring chamber is adapted to communicate with at least said rebound chamber during only a portion of the compression and rebound strokes of the shock absorber and is closed relative to the atmosphere.

2. The shock absorber as defined in claim 1, wherein said shaft includes means for varying a volume of the shock absorber.

3. The gas sprung and pressure dampened shock absorber according to claim 1, wherein closing means is provided for blocking communication between the negative gas spring chamber and the rebound chamber during an initial portion of the compression stroke and an end portion of the rebound stroke of the shock absorber.

4. The gas sprung and pressure dampened shock absorber according to claim 1, wherein the closed end of the cylinder and the closed end of the shaft each have a connector on an outer side thereof for enabling connection of the shock absorber between relatively movable parts of a bicycle.

5. A gas sprung and pressure dampened shock absorber comprising:

a cylinder having a closed end and an open end;

a hollow shaft having a closed end and an open end; said open end of said shaft being reciprocally received within said cylinder through said open end of said cylinder;

a piston positioned substantially closing said open end of said shaft and slidably and sealingly engaging an inner wall of said cylinder;

at least two distinct gas-filled chambers, a first of said chambers being a variable volume chamber bounded by the inner wall of the cylinder and the piston, said variable volume chamber decreasing in volume during compression of said shock absorber due to telescopic movement of said shaft into said cylinder for increasing the pressure of the gas therein and increasing resistance to further compression of the shock absorber, and a second of said chambers being a constant volume chamber bounded by an inner wall of the shaft and the piston;

flow passage means for allowing a controlled and restricted gas flow between the variable volume chamber and the constant volume chamber, said flow regulating the rate at which the shock absorber compresses and rebounds; and a third gas filled chamber formed between an outer surface of said shaft and said inner wall of said cylinder;

wherein the third chamber is adapted to communicate with at least said rebound chamber during only a portion of the compression and rebound strokes of the shock absorber, said third chamber increasing in volume during compression of the shock absorber by an amount that is less than said increase in the volume of said variable volume chamber.

6. The gas sprung and pressure dampened shock absorber according to claim 5, wherein closing means is provided for blocking communication between the third chamber and the constant volume chamber during an initial portion of a compression stroke and an end portion of a rebound stroke of the shock absorber.

7. The gas sprung and pressure dampened shock absorber according to claim 5, wherein said flow passage means comprises a plurality of flow passages, at least one of which has a pressure responsive one-way valve for controlling flow therethrough.

8. The gas sprung and pressure dampened shock absorber according to claim 7, wherein said flow passages comprise an orificed flow passage in addition to said at least one flow passage having said pressure responsive one-way valve.

* * * * *